Patented Dec. 23, 1930

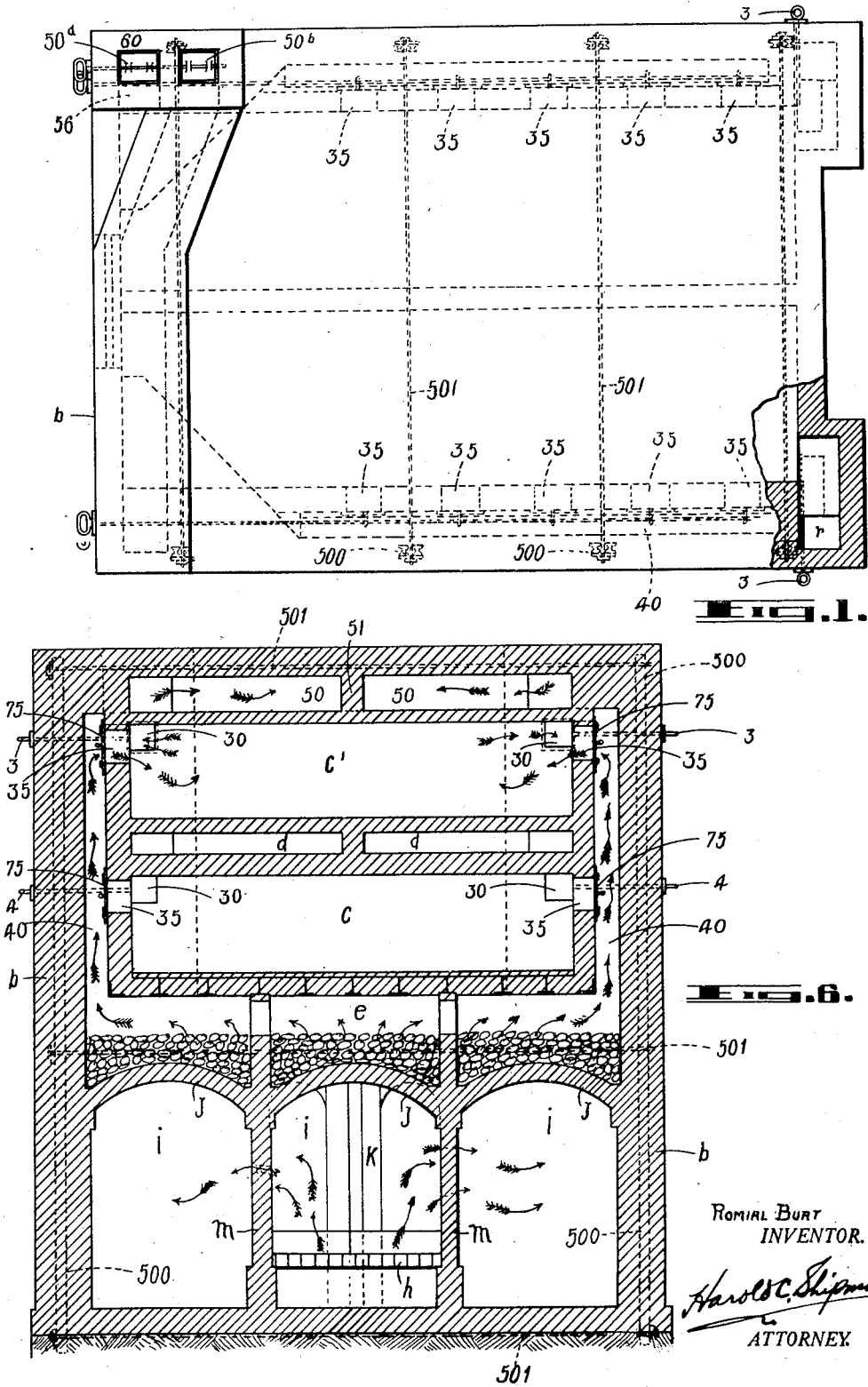

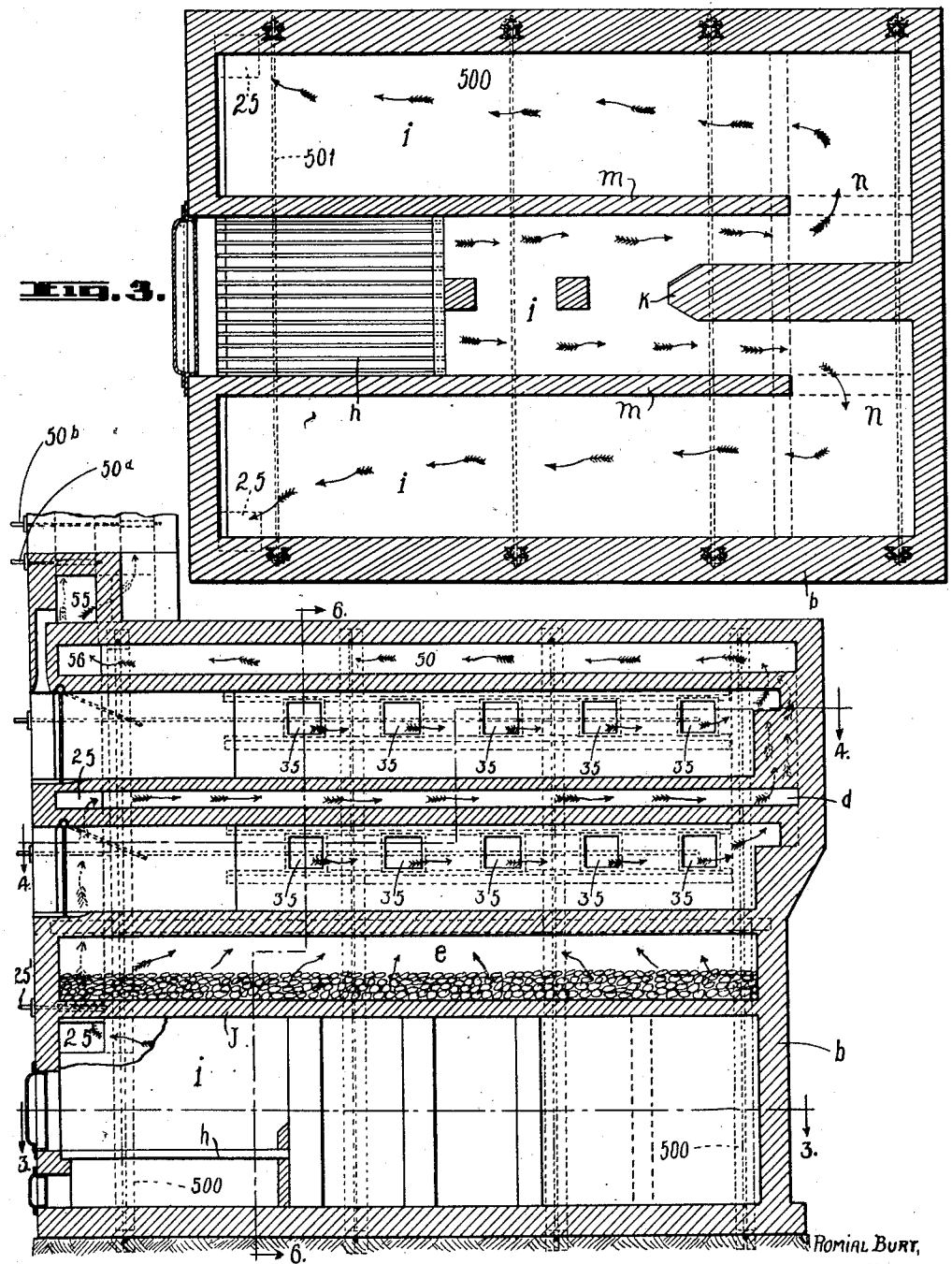

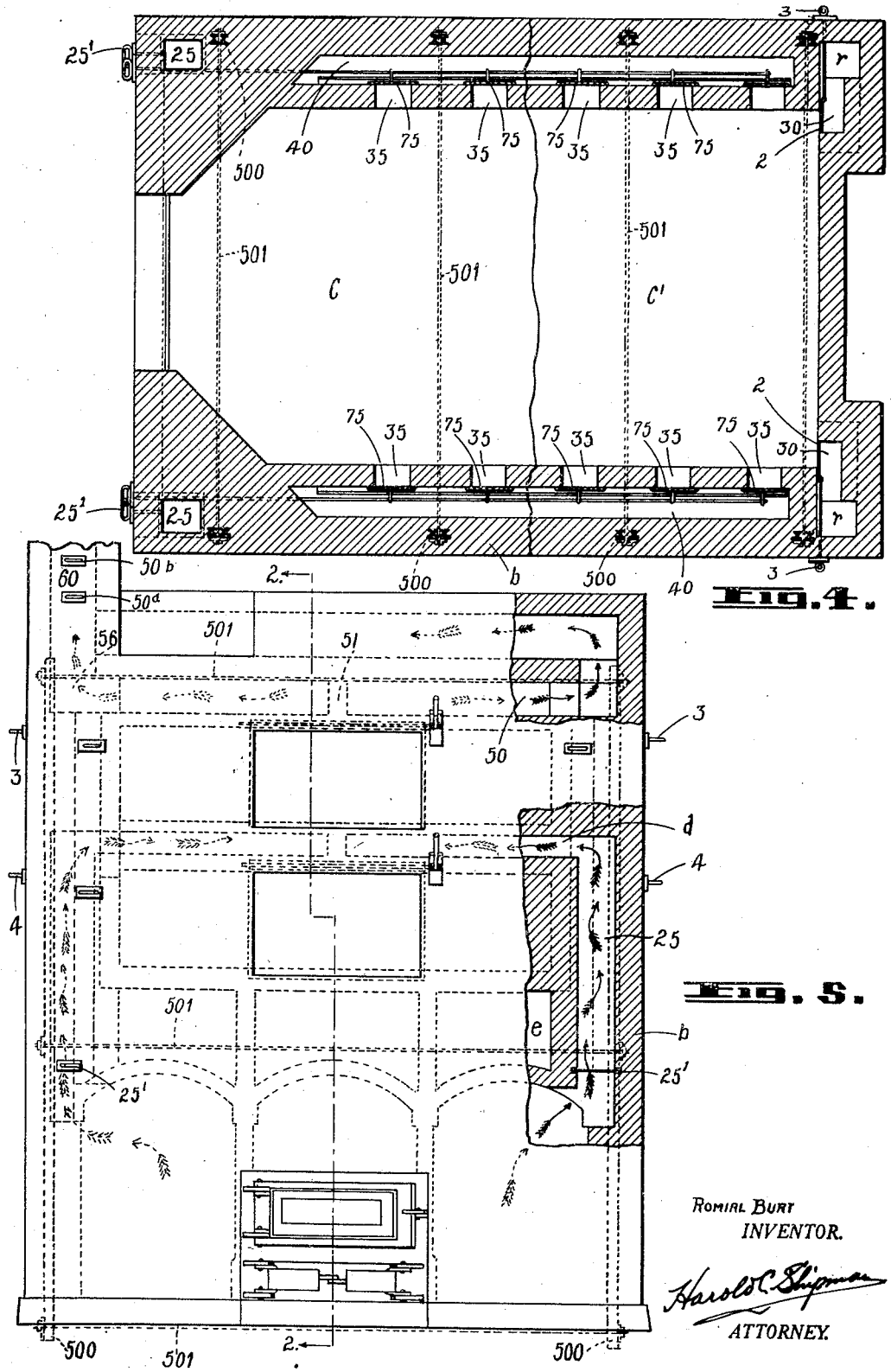

1,785,763

UNITED STATES PATENT OFFICE

ROMIAL BURT, OF MONTREAL, QUEBEC, CANADA

OVEN

Application filed November 12, 1928, Serial No. 318,744, and in Canada June 14, 1928.

My invention relates particularly to ovens for baking bread and has for its object to make the baking of bread more economical and the construction of ovens of this type less costly and more durable.

Broadly stated my improved oven comprises a bread and cake baking oven over a chamber containing pieces of stone, iron and other readily heat-absorbing and transmitting solids. A fire place or furnace is located below and its heat communicates by radiation with this chamber through separating arches; and damper-controlled flues transmit the furnace gases around the baking ovens to a chimney. A separate chimney connection conducts to the atmosphere the surplus heat from the ovens, as well as the moisture arising from the bread being baked and separate flues conduct the heat from the interior of the heating chamber to the ovens. Dampers control the various flues and the shell of the oven containing the baking elements and the flues consists of a frame composed of rails, linked together transversely and bricks enclosing the rails.

For full comprehension, however, of my invention reference must be had to the accompanying drawings in which similar reference characters indicate the same parts and wherein:

Figure 1 is a plan view partly in section;

Figure 2 is a vertical longitudinal section on line 2—2 Figure 5;

Figure 3 is a horizontal sectional view on line 3—3 Figure 2;

Figure 4 is a horizontal sectional view on line 4—4 Figure 2;

Figure 5 is a front elevation of my improved oven partly in section; and Figure 6 is a transverse vertical sectional view on line 6—6, Figure 2.

The shell of my oven is indicated at $b$, and presents, preferably, two ovens $c$, $c^1$ for baking bread, cake and the like, one above the other, and separated by a flue $d$, while a chamber $e$ immediately beneath the lower oven is filled with pieces of stone or field stones and pieces of scrap iron or other solids for the purpose of accumulating heat.
The fire place $h$ is located within and at the bottom of a combustion chamber $i$, the top $j$ of which is formed by arches forming the floor of the chamber $e$. The combustion chamber has a middle division wall $k$ extending from front to rear thereof; and a pair of baffle walls $m$ form the sides of this combustion chamber and are of less length rearwards than the combustion chamber, thereby presenting a pair of oppositely extending cross flues $n$. The vertical flues 25 communicate from the side compartments of the combustion chamber $i$ to the flue $d$. The travel of the products of combustion in the flues 25 is controlled by the pull dampers $25^1$. A series of short flues 30 serve to draw off the steam arising from the bread when first entered into the oven to be baked, a second series of flues 35 effect communication between the flues 40 leading from the chamber $e$, thus supplying dry heat to the ovens. The entry of the dry heat from flues $e$, 40 and 35 cause the steam rising from the bread to be expelled through flues 30 and $r$ to the chamber 50, divided as at 51. From these chambers the surplus heat escapes by the two flues 55 and 56 to the chimney 60. The exit of the products of combustion from the left portion of the chamber 50 passing to the flue 56 will be controlled by the control damper $50^a$ while the exit of the products of combustion from the right portion of the chamber 50 to the flue 55 will be controlled by the pull damper $50^b$. The steam from the moist bread in the ovens is drawn off by flue $r$ through flues 30. From the flue $r$ this steam is drawn to the chimney through flue 50. To regulate the flues 35 of each oven four series of dampers 75 control the various series of the flues 35 as it may be required to regulate the heat in the ovens. A damper 2 with operating handle 3 controls the flow of heat from the top oven $c^1$ to the chimney and a second damper with operating handle 4 controls the communication between the bottom oven $c$ and the chimney.

With the foregoing arrangement of chambers, flues and dampers a baker can regulate the heat of the ovens and cut off the heat of one oven if desired; and the fact that the fire becomes low or goes out the situation is taken care of temporarily by the supplemental heat accumulated in the stones, etc., in chamber e. The structure is reinforced and braced during erection by a series of vertically disposed railway rails 500 arranged in pairs as shown in Figures 3 and 4, the rails at one side being connected and braced relatively to the rails at the other side by bolts 501. The bolts may be extended through the horizontal partition between the ovens and forming the walls of the flues or through the heat absorbing and transmitting chamber e, or otherwise as desired provided the rails and bolts reinforce and brace the structure. Any suitable damper arrangement may be placed in the exhaust from the chamber 50 or in the chimney 60 to control the exit of combustion gases from this chamber 50.

What I claim is as follows:

1. An oven embodying outer walls, a combustion chamber, baking ovens disposed above said combustion chamber, a heat-radiation chamber between said combustion chamber and said ovens, there being an air space between said ovens and said outer walls, heat-storing and radiating material in said heat radiation chamber, with an air space between said material and said ovens, in communication with the first-mentioned air space.

2. An oven embodying outer walls, a combustion chamber, baking ovens disposed above said combustion chamber, a heat-radiating chamber between said combustion chamber and said ovens, there being an air space between said ovens and said outer walls, there being heat storing and radiating material in said heat radiation chamber, with an air space between said material and said ovens, in communication with the first-mentioned air space, and means for controlling the radiation of heat from said material to said ovens respectively.

In testimony whereof, I affix my signature.

ROMIAL BURT.